Jan. 28, 1964     E. R. WAGNER     3,119,690
PROCESS OF MAKING POWDERED COPPER AND UTILIZING THE SAME
Filed Sept. 14, 1959     2 Sheets-Sheet 1

INVENTOR.
EDGAR R. WAGNER
BY
ATTORNEY

United States Patent Office 3,119,690
Patented Jan. 28, 1964

3,119,690
PROCESS OF MAKING POWDERED COPPER
AND UTILIZING THE SAME
Edgar R. Wagner, New York, N.Y., assignor to Apollo Metals and Chemical Corporation, Apollo, Pa., a corporation of Pennsylvania
Filed Sept. 14, 1959, Ser. No. 839,641
6 Claims. (Cl. 75—226)

The present invention relates to a process of recovering copper, and it particularly relates to a process of recovering copper and producing it in high purity and in compacted form.

It is among the objects of the present invention to provide a low cost high yield, inexpensive and economical procedure for producing low cost pure metallic copper from scrap or impure copper combinations in a condition where it is in compacted form and ready for further metallurgical processing.

Another object is to provide a novel copper recovery process, particularly designed for the recovery of copper from nonferrous copper materials in which the copper is separated and recovered with a higher rate of production, with low consumption of chemicals and with equipment requiring little space consumption and a minimum of manual supervision and which will produce a high purity metallic copper at low cost with practically 100% yield.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one preferred embodiment of the present invention, the copper scrap is first leached or solubilized with an aqua ammonia solution in a digester, which aqua ammonia solution may desirably contain from 10 to 18% of ammonia and preferably about 14% of ammonia.

Although the material is metal turnings, or copper-containing scrap such as brass, scrap containing about two-thirds copper and one-third zinc, various other types of copper alloys with nickel, cobalt, zinc, or lead may be similarly processed.

Desirably about sixty to seventy-five parts of ammonia or about six hundred to seven hundred parts of aqua ammonia containing about 12% to 14% of actual ammonia may be employed for about every one hundred to one hundred and fifty parts metal scrap containing copper, assuming that the scrap is about 60 to 70% copper.

In lieu of scrap, it is also possible to use finely divided copper ores or other copper containing materials.

The copper when dissolved will form an ammoniacal solution in which there will be about seventy-five parts of copper in the form of cupric oxide and cuprous oxide for each one hundred and twenty to one hundred and forty parts of ammoniacal compound.

The ammonia solution desirably contains about one-half to three-fourths and desirably two-thirds of its ammonia compound in the form of free ammonia with the balance being desirably ammonium carbonate.

In the preferred system, the copper scrap or other copper material is placed in storage tanks and the aqua ammonia is repeatedly circulated therethrough until the ammoniacal solution contains about 8 to 10% of dissolved copper with an excess of 2 to 3% residual ammonia.

This recirculation, depending upon the amount of aqua ammonia and the amount of scrap, may take about one-half to three hours, and it desirably is accomplished at atmospheric pressure and temperature although pressures up to three or four atmospheres and temperatures up to 50° to 85° C. may also be employed.

A certain amount of carbon dioxide is always present to build up the ammonium carbonate concentration up to 20 to 30%, and in some instances, it may build up to 50% of the total available ammonia.

After the solution has been accomplished, the liquid extract is passed through a sludge filter in which any suspended material such as iron hydroxide or aluminum hydroxide is removed and at the same time, any sand, metal particles or dirt from the scrap will also be removed.

After the filtration, the solution is passed into an ammonia still which is heated by steam coil or by a flame and the ammonia vapor will be driven off together with the carbon dioxide and some water, and it may be recovered for reuse as an aqua ammonia solution.

This will result in a precipitation out of cuprous oxide and cupric oxide together with any nickel, cadmium, cobalt or zinc which may also have been dissolved in the ammoniacal solution.

Then the resulting precipitate of the oxides with entrained moisutre is pumped by a sludge pump to a separating tank where the zinc and other oxides are removed by means of caustic soda solution containing from 10 to 30% of caustic soda.

The residual cuprous and cupric oxides are then passed into a rotary filter and separated from the zinc-caustic solution.

The copper oxides are dried and then passed through a continuous reduction kiln in which they are subjected to reduction with hydrogen, carbon monoxide or ammonia or combinations thereof.

The reduction temperature should normally be in the range of 1000° to 1800° F. but will vary with the particular reducing agent or reducing gas.

While still in hot condition, the resultant reduced copper powder, having the clean contact faces resulting from the reduction, is passed into a compression apparatus without contact with air or oxygen and in an atmosphere of a reducing gas such as water gas, to compact the finely divided powdered copper to form a solid copper strip or rod.

The extrusion will form a solid or hollow copper product, whether strip, rod, sheet or tube, and the product may be both drawn or rolled in a suitable reducing or neutral atmosphere.

As an alternative procedure before reduction of the copper, the separated copper oxides may be packaged or otherwise utilized as such or converted into suitable copper salts.

Furthermore, the zinc which is recovered in the form of sodium zincate is precipitated in a precipitating tank with carbon dioxide to form zinc carbonate which may be dried and then suitably used.

The result is that there is produced a low cost high purity copper ranging up to 99% to 100% pure copper.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
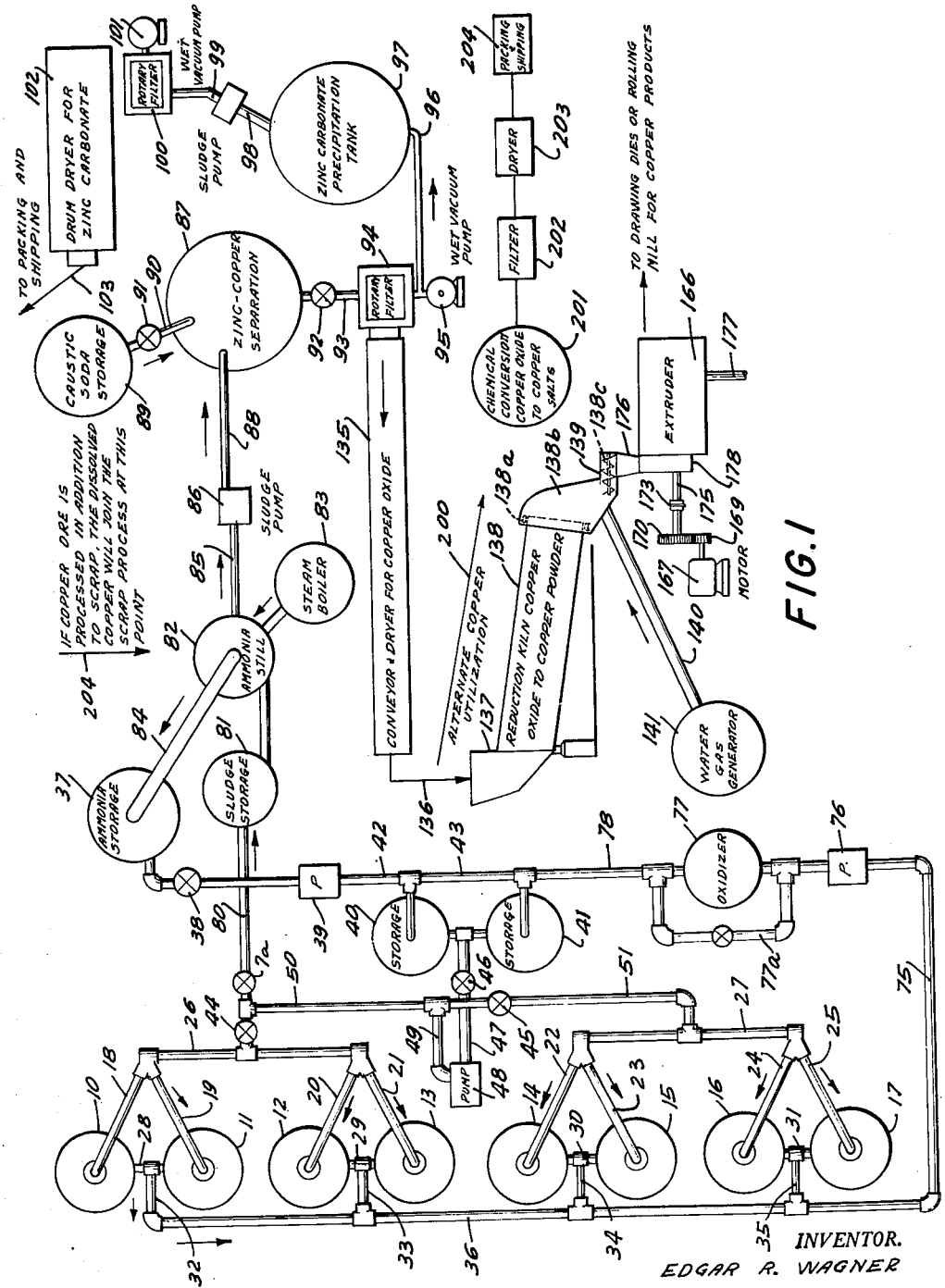
FIG. 1 is a diagrammatic flow sheet showing the process of the present application.

Referring to FIG. 1, the digesters 10 to 17 have the inlet connections 18 to 25 from the headers 26 and 27.

These digesters have the outlet T connections 28, 29, 30 and 31 which leads have the stem connections 32, 33, 34 and 35 desirably from the bottom of the digesters to the outlet header 36.

The inlet connections 18 to 25 are desirably to the top of the tank containing the body of copper scrap.

The incoming solution is from the ammonia storage tank 37, and this solution is drawn past the valve 38 by the pump 39 which forces it into the storage tanks 40 and 41 by the connections 42 and 43.

The storage tanks 40 and 41 may be filled with the proper amount of ammonia solution and then the valve 38 may be closed, and the valves 44 and 45 opened so that the ammonia may be caused to flow past the bottom outlet valve 46 and the pipe 47 through the pump 48 and the conduit 49 into the pipes 50 and 51 leading to the headers 26 and 27.

At the same time, the outlet pipe 36 may be connected by the pipe 75 to the pump 76 which forces the ammoniacal solutions through the oxidizer 77 and then back into the storage tanks 40 and 41 through the piping connections 78 and 43.

When the recirculation and oxidization has been completed, the valve 46 may be closed, and the valve 79 on the conduit 80 opened.

With the valves 44 and 45 still open, the pump 48 then may be used to force the ammoniacal solution through the sludge filter 81 and then into the ammoniacal still 82.

A steam boiler 83 will supply steam to the still 82, and the ammonia will be distilled off together with water vapor and carbon dioxide and will pass through the conduit 84 into the ammonia storage tank 47.

From the ammonia still 82, the precipitated copper oxides with other metal oxides such as zinc oxide will pass in the direction 85 to the sludge pump 86 and then to the zinc and copper separating tank 87 by the conduit 88.

The ammoniacal liquors may be reduced as well as practical to cuprous oxide in vessel 77, and they will then pass to the ammonia still 82.

The by-pass 77a may be employed to by-pass the vessel 77.

Caustic soda solution passes from the high elevation tank 89 through the conduit 90 and the valve 91 to dissolve the zinc, and after the solution has taken place, the valve 92 on the conduit 93 is opened and the copper oxides will be separated from the solution of sodium zincate by the rotary filter 94.

The sodium zincate solution is forced by the vacuum pump 95 through the conduit 96 into the precipitation tank 97 where the sodium zincate solution is treated with carbon dioxide to precipitate zinc carbonate.

The zinc carbonate precipitate is passed through the conduit 98 through the sludge pump 99 and then into the rotary filter 100 associated with the wet vacuum pump 101.

The zinc carbonate is passed through the drum drier 102 and then is passed to packing and shipping facilities at 103.

Then the recovered mixed copper oxides from the rotary filter 104 are passed through conveyor 135 and in dried condition through the outlet 136 and dumped into the funnel 137 forming the mouth of the rotating kiln.

In the funnel, the dried oxides act as a seal for the inlet to the rotating reduction kiln which is supplied with hydrogen, carbon monoxide or ammonia to reduce the copper oxides to finely divided copper powder.

The inlet funnel at 137 should have a gas lock separating continuously and regulated to the rate of feed. The metallic copper powder from the reduction kiln 138 then passes into the storage receptacle 138b which is sealed to the lower end of the kiln 138 by the peripheral seal 138a.

From the lower part of the storage chamber 138b, the finely divided particles will be forced through the connection 139 by the screw conveyor 138c into the funnel 176 which feeds into the extruder 166.

The chamber 138b is supplied with reducing gas through the conduit 140 from the reducing gas generator 141.

During the time the finely divided material is in the chamber or storage compartment 138b, there will be a final reduction of all of the particles to metallic copper.

The reducing gases in the chamber 138b may be carbon monoxide, ammonia, or hydrogen or combinations thereof.

Figure 2:
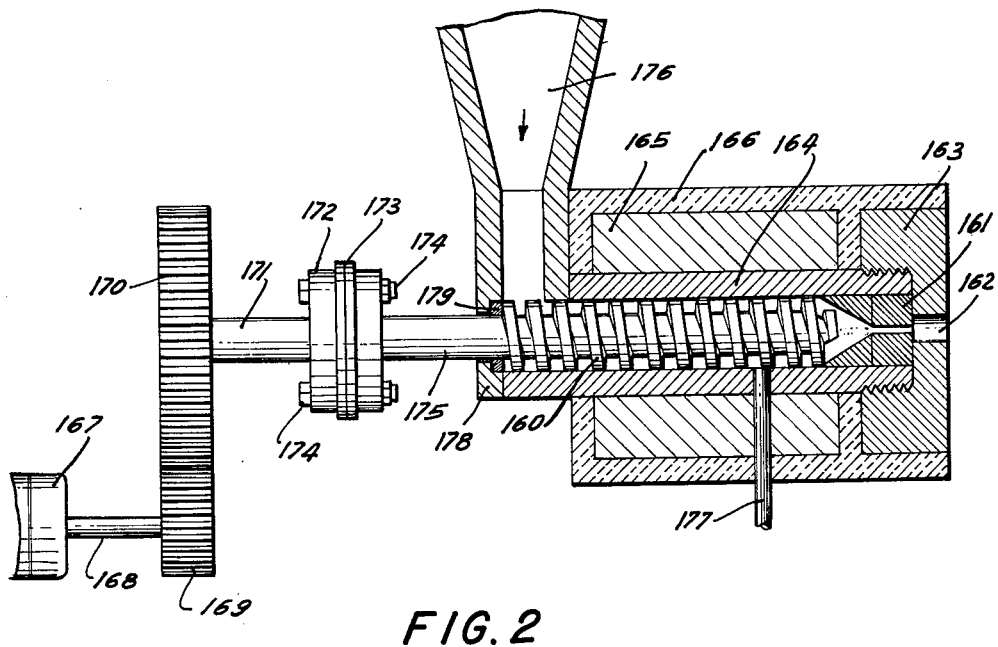
FIG. 2 is a transverse diagrammatic section view showing the screw compressor for forming the reduced copper powder into solid copper material in the form of a strip, rod or bar.

The extruder 166, which then receives the finely divided copper, is shown in small scale in FIG. 1 and in large scale in FIG. 2.

It has a pressure screw 160 the turns of which may come closer adjacent the exit end 161 which feeds into the die heading 163 having the outlet opening 162.

This will effectively decrease capacity of thread thus increasing pressure at the die end.

The pressure may be increased by either decreasing the pitch of the screw or by decreasing the depth of the screw.

Although the preferred pressure for compacting the copper powder is about 25000 pounds per square inch to obtain complete densification, lower pressures below 25000 pounds per square inch may be used to result in a slight porosity or less densification, and the compacted copper may be successfully drawn through small dies to give complete densification.

It closely fits within a tubular extrusive enclosure 164 in respect to which it has a very close clearance of about five to six thousandths of an inch with the copper powder serving as a lubricant.

The casing 164 is enclosed by the heating unit 165 and the thermo-insulating sheath 166.

The screw 160 will be driven from the motor 167 by the shaft 168, the pinion 169 and meshing large gear 170.

The large gear will drive the shaft 171 and the coupling 172 with the insulating plate 173 and the connecting bolts 174.

The shaft 175 leads directly to the extruder 170.

The copper oxide will be fed from the connection 139 down into the inlet feed opening 176 of the extruder, and the copper will be extruded from the die 163 together with the reducing gas at the outlet end of the extruder 160.

There may also be a reducing gas inlet at 177 which will augment the reducing gas feed into the funnel 176.

The end of the extruder casing 164 may have a back plate 178 with a thrust bearing 179, and it is sealed against entry of air.

The heating unit will maintain the metallic copper powder at a suitable elevated temperature of about 1000° to 1600° F.

From the extruder, there is obtained a pure compacted copper.

The copper oxide instead of being reduced may be fed through the conduit 200 to a conversion tank 201 where it will be converted into suitable copper salts, and it then can be filtered at 202, dried at 203 and packed and shipped as indicated at 204.

If any copper ore is to be processed in addition to the scrap, the dissolved copper material may be added to the process at the ammonia still as indicated at 204.

The hot copper powder is desirably compacted in the screw at pressures of about twenty-five thousand pounds per square inch and where additional lubrication is needed, it may be fed into extruder shaft.

Such lubricants may be, for example, graphite or molybdenum disulfide.

This procedure is particularly advantageous in that it gives highly pure dense metallic copper as a final product.

The same procedure as above may be applied to finely divided copper separated from sulphides or carbonates of copper.

Nickel, cobalt and iron powder may be finely compacted at similarly higher temperatures.

As many changes could be made in the above process of making powdered copper and utilizing the same and many widely different embodiments of this invention could be made without departing from the scope of the claims, it is intended that all matter contained in the above description shall be interpreted as illustrative and not in a limiting sense.

The finely divided powdered reduced metal, preferably copper, but with suitable higher temperature nickel, cobalt or iron may be degasified before or during compacting and converted into strip, rod, bar or tubular form, desirably at temperatures of about 1000 to 1500° F. and the densification may be controlled by the pressure applied.

Having now particularly described and ascertained the nature of the invention, and in what manner the same is to be performed, what is claimed is:

1. A process of continuously producing dense metallic copper which comprises reducing downwardly flowing copper oxide by an upwardly flowing current of water gas containing carbon monoxide and hydrogen retaining the finely divided reduced copper in an intermediate receptacle and then passing the finely divided copper through a screw compacting arrangement to densify the same at a pressure of about 25000 pounds per square inch, said finely divided copper being subjected to additional contact with the gas in said intermediate receptacle and retaining the heat of reduction when passed into said screw compacting arrangement.

2. The process of claim 1 in which the temperature is maintained at 1000° to 1600° F.

3. The process of claim 1 in which the finely divided metal is degasified during the compacting operation.

4. A process of continuously producing extruded dense metallic copper from copper oxide which comprises causing finely divided copper oxide to flow obliquely downwardly against an ascending stream of a reducing gas containing carbon monoxide and hydrogen while maintaining a temperature of 1000° F. to 1800° F. to obtain hot finely divided metallic copper in powder form, collecting and retaining the hot powdered reduced copper while subjecting it to fresh reducing gases at said elevated temperature of 1000° F. to 1800° F. while maintaining an atmosphere of the same reducing gas and then screw extruding the powdered copper while retaining the heat of reduction at a pressure of about 25000 pounds per square inch.

5. The method of claim 4 in which the finely divided hot copper powder is degasified during the extrusion.

6. The method of claim 4, said copper powder being passed countercurrent to the reducing gas and being collected and retained and being extruded at substantially a constant temperature between 1000° F. and 1800° F.

References Cited in the file of this patent

UNITED STATES PATENTS

| | | |
|---|---|---|
| 2,134,366 | Hardy | Oct. 25, 1938 |
| 2,287,663 | Brassert | June 23, 1942 |
| 2,659,134 | Leontis et al. | Nov. 17, 1953 |
| 2,814,564 | Hayden | Nov. 26, 1957 |
| 2,882,554 | Heck | Apr. 21, 1959 |

FOREIGN PATENTS

| | | |
|---|---|---|
| 568,248 | Canada | Dec. 30, 1958 |

OTHER REFERENCES

"Metals Handbook," 1948 edition, pp. 862, 863.
"Metals Progress," April 1959, vol. 75, pp. 113, 114, 152.